United States Patent [19]

Yano et al.

[11] 4,278,156
[45] Jul. 14, 1981

[54] CLUTCH ENGAGING AND DISENGAGING MEANS

[75] Inventors: Kazuhiko Yano, Toyonaka; Kazuhiko Ohtsuki, Takarazuka, both of Japan

[73] Assignee: Kanzaki Kokyukoki Mfg. Co., Ltd., Amagasaki, Japan

[21] Appl. No.: 85,105

[22] Filed: Oct. 15, 1979

[30] Foreign Application Priority Data

Oct. 31, 1978 [JP] Japan .................................. 53-134074

[51] Int. Cl.³ .................... F16D 21/04; G05G 9/08
[52] U.S. Cl. ................................. 192/48.91; 74/470; 74/475; 74/527; 192/51; 192/99 S
[58] Field of Search ................ 74/470, 475, 474, 527; 192/21, 51, 48.91, 99 S

[56] References Cited

U.S. PATENT DOCUMENTS

| | | | |
|---|---|---|---|
| 1,630,199 | 5/1927 | Megnin | 74/470 X |
| 2,402,724 | 6/1946 | Bidwell | 74/470 X |
| 2,836,986 | 6/1958 | Kretz | 74/470 |
| 3,043,159 | 7/1962 | Morse | 192/0.096 X |
| 3,176,811 | 4/1965 | Smith | 192/54 |
| 3,269,497 | 8/1966 | Bergstedt | 192/51 |
| 3,525,266 | 8/1970 | Brooks et al. | 74/526 X |
| 3,952,512 | 4/1976 | Feller | 74/470 X |
| 4,087,970 | 5/1978 | Slazas et al. | 74/470 X |

FOREIGN PATENT DOCUMENTS

| | | | |
|---|---|---|---|
| 2416819 | 10/1974 | Fed. Rep. of Germany | 74/470 |
| 1081856 | 12/1954 | France | 74/470 |
| 23459 | of 1911 | United Kingdom | 74/333 |
| 1266840 | 3/1972 | United Kingdom | |
| 1389045 | 4/1975 | United Kingdom | 74/527 |

*Primary Examiner*—Rodney H. Bonck

[57] ABSTRACT

In a remote-controlled mechanical double clutch mechanism such as marine reversing clutch, a novel clutch engaging and disengaging means is employed which comprises an extensible and contractible coupling for a connection between push-pull means of remote control system and control lever associated to the clutch. The coupling includes spring means which is enlarged in spring force thereof due to extension and contraction of the coupling on the way of operating the clutch and provides some additional rotation to the control lever at the terminal moment of operation by the enlarged spring force. Such spring means avoids an unexpected disengagement of the clutch from an engaged condition as well as an unexpected engagement of the clutch from the disengaged condition. The novel clutch operating means may compensate manufacturing error of the remote control system and clearance due to abrasion and permits an easy adjustment and maintenance of such operating means.

7 Claims, 28 Drawing Figures

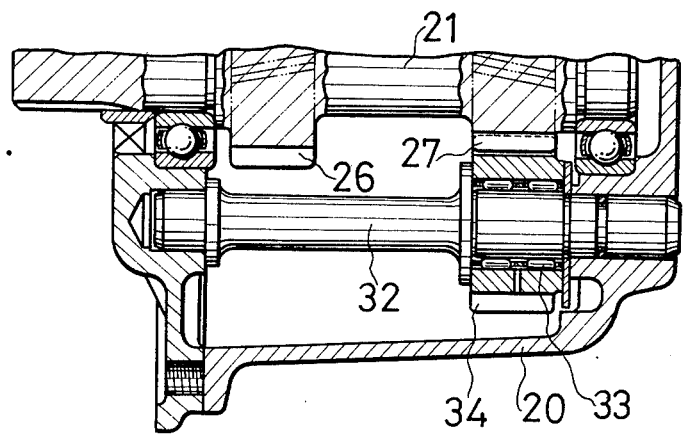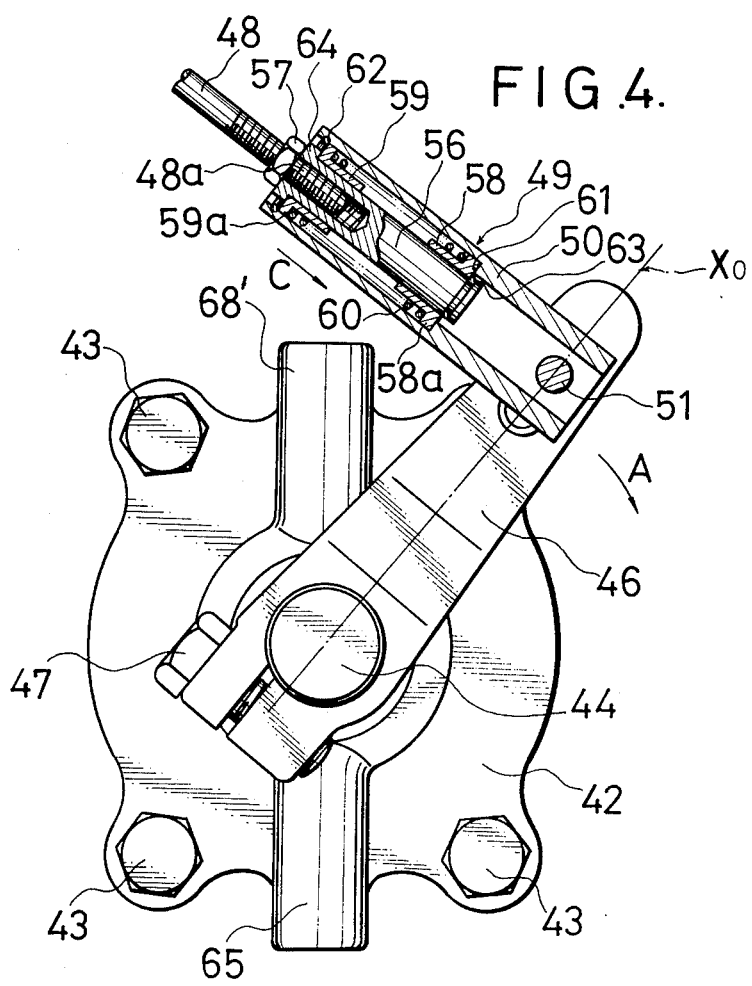

FIG.6c.
FIG.6d.
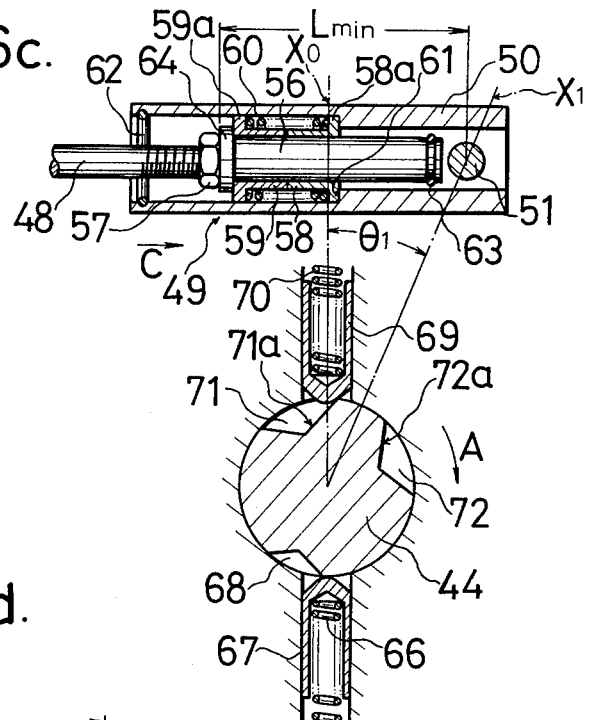
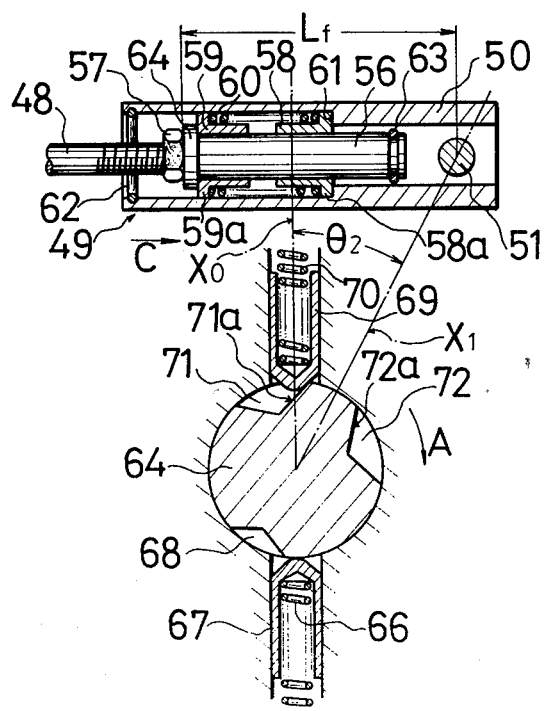

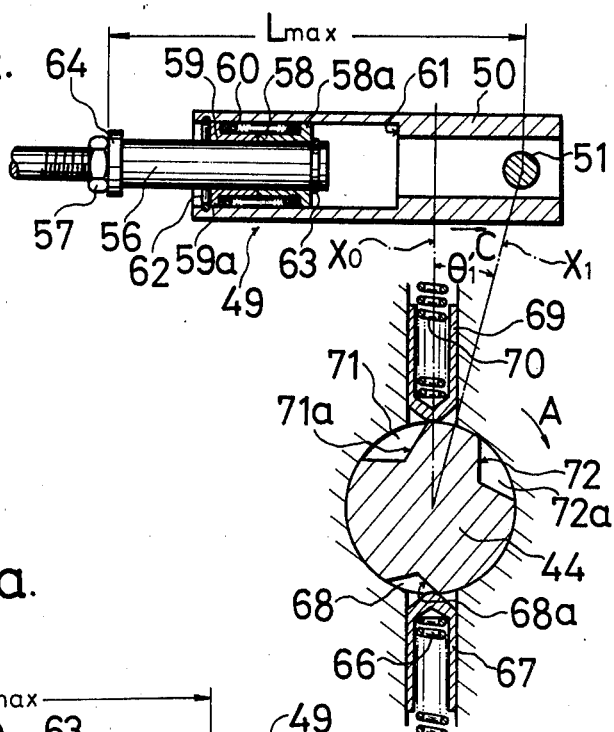
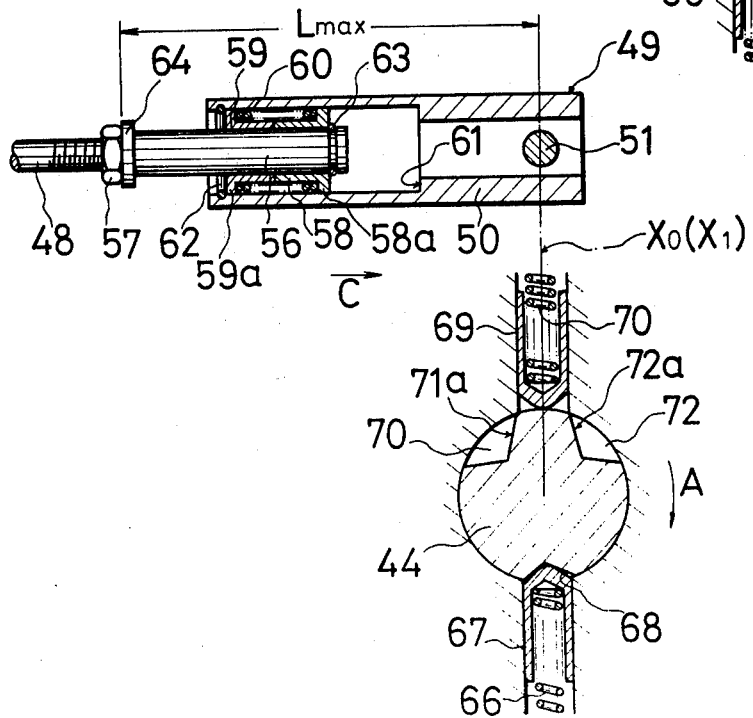

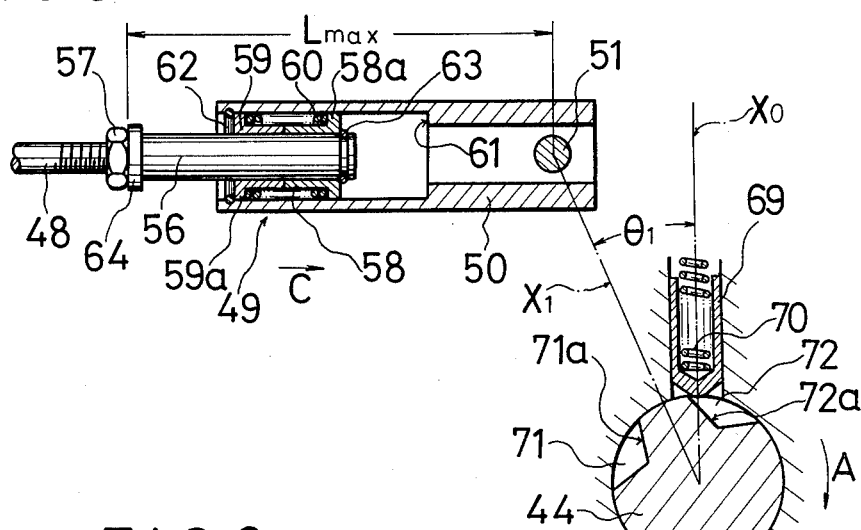
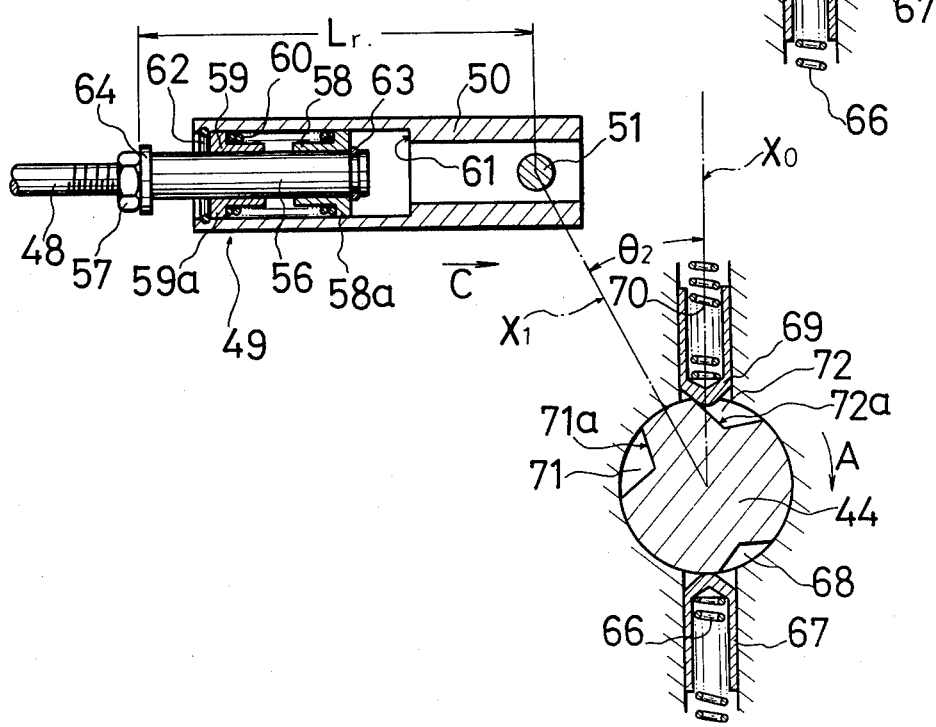

CLUTCH ENGAGING AND DISENGAGING MEANS

BACKGROUND OF THE INVENTION

This invention relates to a novel clutch engaging and disengaging means which is used in conjunction with a mechanically operated double clutch mechanism of the type in which a movable clutch member is displaced axially from a neutral position into a first or second direction selectively for effecting a first or second engagement of the clutch resulting in an operative connection of one power transmitting member to another first or second power transmitting member and in which once the clutch has been engaged said movable clutch member is forced to displace into a direction of engaging the clutch by the torque transmitted by such clutch. More particularly, the present invention relates to a novel clutch engaging and disengaging means comprising a control level which is rotated by push-pull control means to displace said movable clutch member in a clutch mechanism of the above described type and which is retained in its neutral position by a spring-biased detent means.

A clutch of the above described type is suitably used in, for example, a marine propulsion device for transmitting power of engine to a propeller shaft selectively into forward or backward direction of marine propulsion. In a clutch of this type, when the clutch has once been engaged the movable clutch member is forced into a direction of engaging the clutch by free-wheel action or servo-action with a pressure corresponding to the torque transmitted by the clutch. A clutch of this type has, therefore, an advantage that efficiency of torque transmission is high and another advantage that the clutch may be engaged with a small operating force so far as the clutch is operated to engage within a small torque range. Clutches of this type may thus be controlled by a remote control and, in practise, are controlled generally by a remote control. In general, such remote control is carried out by a single remote control lever in association with throttle control of an engine which constitutes a source of power to be transmitted by the clutch. Remote control system for such remote control is, in general, fashioned as disclosed in, for example, U.S. Pat. No. 3,043,159 such that fuel supply to the engine is reduced to keep the engine idling during a clutch-engaging operation of displacing the remote control lever from a neutral position into one or another direction and such fuel supply is increased, after the clutch has been engaged, by displacing further the remote control lever to regulate the power of engine in a normal operating condition of such engine, whereas for remotely disengaging the clutch fuel supply to the engine is firstly reduced by displacing the remote control lever toward the neutral position to bring the engine idling and then the clutch becomes disengaged under an idling condition of the engine by displacing further the remote control lever toward the neutral position.

An example of clutches of the described type and operating means therefor are disclosed in U.S. Pat. No. 3,269,497. The clutch itself disclosed in this U.S. Patent is fashioned such that it comprises cone-shaped first and second friction surfaces formed respectively to first and second clutch members, which are integral with first and second gears located at the driving side of clutch, and a pair of cone-shaped friction surfaces which are formed to a movable clutch member mounted on a rotatable shaft by a helical spline or steep pitch screw thread connection at a location between the first and second gears. Once one of the pair of friction surfaces has become in contact with one of the first and second friction surfaces, the movable clutch member is forced to displace into a direction of enlarging the clutch engaging force by free-wheel action caused by the torque. This clutch disclosed in U.S. Pat. No. 3,269,497 is also remote-controlled. Clutch engaging and disengaging means which is directly associated to such clutch and is operated by a remote control system through push-pull control means comprises a wedge-shaped shifting pin which is received by a peripheral V-shaped groove on the above mentioned movable clutch member. The V-shaped groove is particularly fashioned such that center of such groove is eccentric to the common axis of the movable clutch member and rotatable shaft mounting the movable clutch member. The shifting pin is slidably mounted in a control shaft, which is operated to rotate by a control lever projected radially from such control shaft, at an eccentric location of the control shaft and is forced to slide toward the V-shaped groove by a spring. Consequently, when the control lever is rotated by push-pull control means to cause a rotation of the control shaft into one or another direction, the shifting pin becomes displaced from its neutral position toward one or another direction to push the clutch member into a clutch-engaged position. In an engaged state of the clutch, the shifting pin slides to and fro due to eccentricity of the V-shaped groove. The mentioned control shaft is supported by a sleeve so that it may somewhat move toward and away from the movable clutch member. Between the control shaft and the sleeve is disposed a cam mechanism for limiting retreatment of the control shaft. When the control shaft is rotated toward its neutral position, the control shaft is somewhat advanced toward the movable clutch member by such cam mechanism and enlarges the spring force for biasing the shifting pin which is displaced toward its central position in the V-shaped groove by a rotation of the control shaft toward the neutral position due to the eccentric mounting in such control shaft. At the same time, the shifting pin is restrained from moving away from the movable clutch member. Under such condition, the shifting pin rides step by step up on one side of the eccentric V-shaped groove to cause a displacement of the movable clutch member toward a clutch disengaging direction.

This clutch engaging and disengaging means according to U.S. Pat. No. 3,269,497 is such in that particular considerations are taken on the operating mechanism which are located within a housing for the clutch. The wedge-shaped shifting pin employed in this clutch engaging and disengaging means is in contact with the movable clutch member along a line, since such shifting pin is mounted in the control shaft at an eccentric location of such shaft and engages to the movable clutch member at a side of the V-shaped groove which is eccentric to the axis of the clutch. Further, this clutch engaging and disengaging means has no freedom or play in the direction of engaging the clutch because displacement of the control lever toward the direction of engaging the clutch is limited or restrained by the mentioned cam mechanism.

Another example of clutches of the type set forth at the beginning is such that is disclosed in, for example, British Pat. No. 1,266,840 and U.S. Pat. No. 3,176,811.

A clutch of this kind comprises a plurality of friction disks of one kind and a plurality of friction disks of another kind. Both kinds of friction disks are arranged alternately. A rotatable plate which is displaced along the axis of the clutch so as to push the friction disks for engaging the clutch is pushed toward the friction disks through a series of balls which are in contact with such rotatable plate at a series of circumferentially extending ramp faces and ride up on such ramp faces for pushing the rotatable plate. Once the clutch has been engaged, the torque transmitted by the clutch acts to ride the balls up further on the ramp faces thereby pressure against the friction disks and, therefore, clutch engaging force being enlarged. That is, a servo-action is caused. In general, a clutch of this kind is engaged and disengaged by means of shifting sleeve which is disposed around the rotatable plate. Such shifting sleeve is displaced along the axial direction so as to displace the rotatable plate through the balls. The shifting sleeve is displaced by, in general, a remote control.

Preferably, an engaging and disengaging means which is associated directly to a remote-controlled clutch of the type detailed hereinbefore will reduce the clutch operating force or load on one hand. But, on the other hand, it is preferred that such clutch engaging and disengaging means will provide a pressure or force directing toward a direction of engaging the clutch to the movable clutch member still in an engaged state of the clutch and also will prevent with certainty an unexpected engagement of the clutch in the disengaged state of the clutch. That is, it is likely that a spontaneous disengagement of the clutch will not be caused because the movable clutch member is forced in an engaged state of the clutch by the torque to displace toward a direction of engaging the clutch. Such spontaneous or unexpected disengagement of the clutch may, however, be caused, for example, in such a case where, in a marine propulsion device in which a clutch of this type is interposed between an engine and propeller, power or rotation of the engine is suddenly reduced during a sailing. This is because, in such a case, a reaction force is applied to the propeller from water due to the inertia of such propeller so that the clutch or the engaged portion thereof may be applied with a torque from the side of the propeller which torque may be larger than that transmitted from the side of the engine. Further, because a clutch engagement is enhanced automatically by the torque in a clutch of this type, when an unexpected contact between engageable clutch members is caused the clutch will become engaged by the torque transmitted to the driving side of clutch. Such unexpected engagement of the clutch is dangerous and should be avoided with certainty. Furthermore, it is preferred that abrasion of clutch operating members will be prevented as much as possible. For this, engagement between two movable clutch operating members which are displaced together due to such engagement is preferably such in that the two members are in engagement to one another with surfaces thereof.

A remote control system may have, of course, a manufacturing error or tolerance. Abrasion due to use is, of course, caused on the engageable clutch members and the like. It is thus preferred that a clutch engaging and disengaging means may absorb or swallow such manufacturing error and/or clearance due to such abrasion. It is further preferred that a clutch operating means permits an easy adjustment and maintenance thereof. Such means is preferred, of course, to be simple in structure.

The present invention aims to provide a novel clutch engaging and disengaging means of the type set forth at the beginning which satisfies as much as possible the demands detailed above.

SUMMARY OF THE INVENTION

According to the present invention, such object is attained in a clutch engaging and disengaging means set forth at the beginning in that said control lever is operatively connected to said push-pull control means by a coupling which is telescopically extensible and contractible within a limited scope of extension and contraction, said coupling comprising spring means which is enlarged in spring force thereof due to extension and contraction of the coupling by the push-pull action of said push-pull means and accumulates such spring force and which extends or contracts the coupling by the accumulated spring force at the terminal moment of operating the clutch to cause some further rotation of said control lever in a direction toward which such control lever has been rotated.

Near the terminal moment of a clutch engaging operation, detent action by detent means for retaining the control lever and clutch mechanism in neutral becomes released so that resistance against rotation of the control lever becomes much reduced. The above mentioned spring means rotates the control lever as from the time of occurance of such considerable reduction in resistance against rotation of the lever further into a direction of engaging the clutch and achieves an engagement of the clutch. Near the terminal moment of a clutch disengaging operation, resistance against rotation of the control lever becomes much reduced at the time when engagement of the clutch has just been released. The above mentioned spring means rotates the control lever as from such time somewhat further into a direction of disengaging the clutch.

In an engaged state of the clutch, the mentioned spring means always forces the movable clutch member by a force or pressure to move into a direction of engaging the clutch. An unexpected disengagement of the clutch is, therefore, avoided. Because the mentioned spring means rotates in a clutch disengaging process the control lever from a position, where clutch engagement is released, further until such control lever reaches its neutral position, an unexpected engagement from the neutral or disengaged state of clutch is avoided with certainty. Rotation of the control lever at the terminal moment of clutch operating process is attained by an extension or contraction of the coupling under the action of spring means. Manufacturing error in a remote control system and an additional clearance due to abrasion may, therefore, be absorbed or swallowed within the scope of such extension and contraction of the coupling.

In the clutch engaging and disengaging means according to the present invention, a mechanism for smoothening clutch engaging and disengaging operation is provided by utilizing coupling means for connecting between the push-pull means in a remote control system and the control lever provided at the side of the clutch. The novel means according to the present invention is thus simple in structure. Further, the mechanism provided by utilizing the coupling means which is located outside a housing for the clutch permits an easy adjustment and maintenance of such mechanism.

The coupling which is structured according to the present invention so that it is telescopically extensible and contractible is preferably fashioned such that it comprises a first coupling member which is pivotally connected to the control lever and a second coupling member which is fixedly connected to the push-pull control means, the said first and second coupling members being fitted telescopically with one another thereby the coupling being telescopically extensible and contractible. The coupling structured in this fashion is advantageous in simplifying structure and in rigidity.

The mentioned spring means may be formed either by a compression spring or compression springs or by a tension spring or tension springs. Compression spring or springs is/are enlarged in spring force thereof by being contracted or compressed, whereas tension spring or springs is/are enlarged in spring force thereof by being extended or lengthened. Structure for contracting or extending such spring(s) so as to enlarge spring force thereof in response to an extension or contraction of the coupling may be fashioned variously, as can be recognized with ease by those skilled in the art and as can be seen in the embodiments of the invention which will be described later.

In a preferred aspect of the present invention, a control shaft is provided which is formed with a pair of notches which are apart from one another in a circular direction and each of which has a sloped inner surface extending along the circular direction, said control shaft being connected drivenly to said control lever, and a slidable bar is provided which is arranged so that in the neutral condition it is located between said pair of notches and which is forced by a spring means to project toward the control shaft, said pair of notches and said slidable bar being disposed so that during a clutch engaging operation said slidable bar is projected at a sharpened end thereof into one of said notches and engages said sloped inner surface before the releasing of detent action by said detent means. In such a case, a further force for rotating the above mentioned control shaft and, therefore, the control lever is provided after the releasing of detent action by the detent means due to a projecting action of the slidable bar into one of the notches by the force of said spring and due to the presence of said sloped inner surface so that the final rotation of the control lever by the spring means in the coupling is assisted.

BRIEF DESCRIPTION OF THE DRAWINGS

The present invention and its attendant advantages will become more readily apparent as the specification is considered in conjunction with the accompanying drawings in which like reference numerals designate like parts throughout the several views thereof. In the drawings:

FIG. 2 is a cross-sectional view showing a part of the clutch mechanism shown in FIG. 1;

FIG. 4 is an enlarged sectional view, partially omitted, taken along line IV—IV of FIG. 3 showing in detail a coupling employed in the first embodiment;

FIGS. 6a, 6b, 6c and 6d are sectional views illustrating successively movements of one and another parts of the first embodiment when the clutch is operated to engage in the forward direction of rotation, among which FIG. 6a shows the state where the clutch is in neutral and FIG. 6d shows the state where the clutch is engaged in the forward direction of rotation;

FIGS. 7a, 7b and 7c are sectional views illustrating successively movements of one and another parts of the first embodiment when the clutch is operated to disengage from the engaged state in the forward direction of rotation;

FIGS. 8a, 8b and 8c are sectional views illustrating successively movements of one and another parts of the first embodiment when the clutch is operated to engage in the backward direction of rotation, among which FIG. 8c shows the state where the clutch is engaged in the backward direction of rotation;

DESCRIPTION OF PREFERRED EMBODIMENTS

Figure 1:
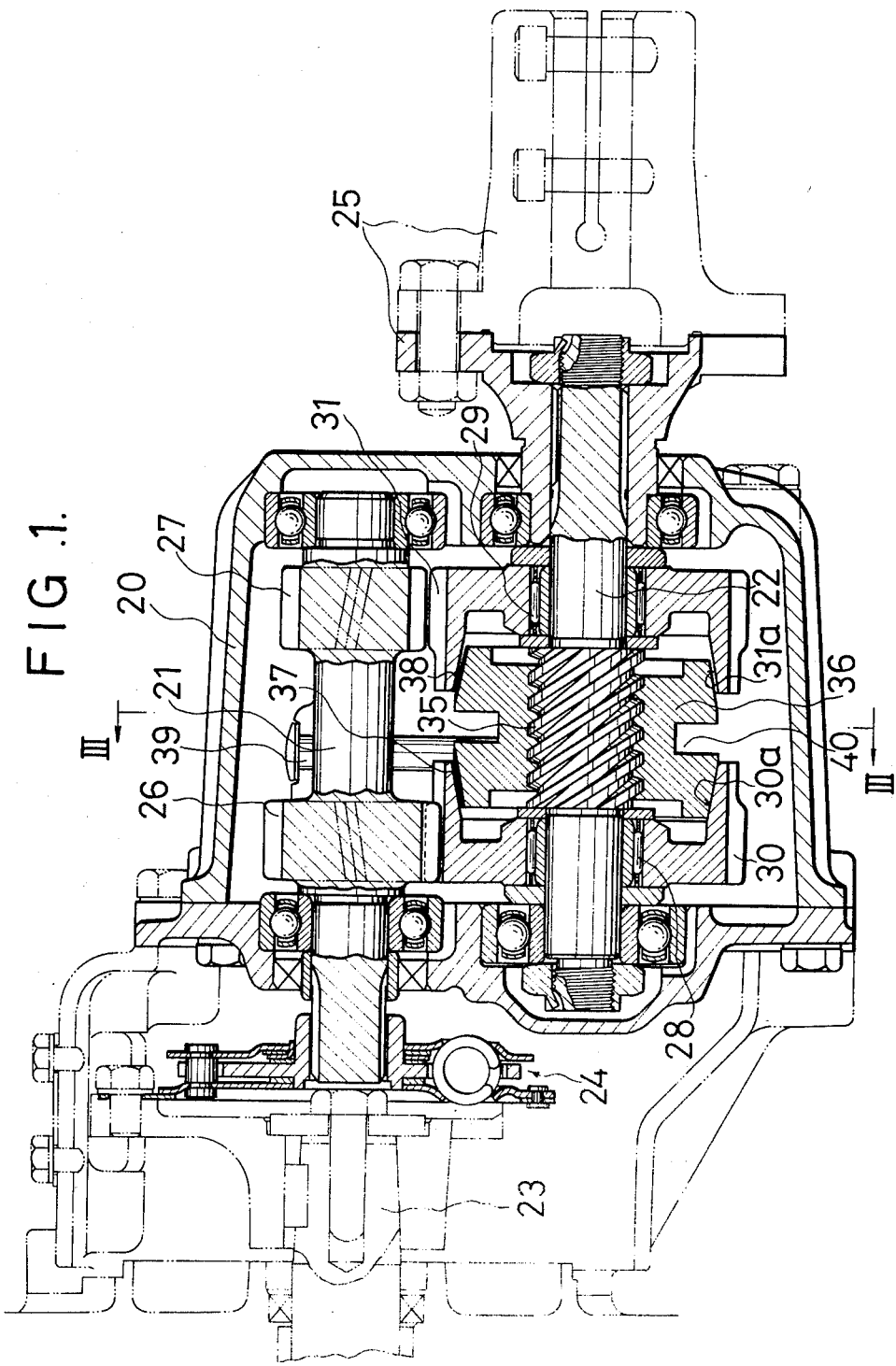
FIG. 1 is a vertical sectional view showing a clutch operated by a first embodiment of the clutch engaging and disengaging means according to the present invention and mechanisms associated thereto in which a movable clutch member of the clutch is shown in the neutral position with respect to the upper half of such member and in a clutch engaged position with respect to the lower half of such member.
Figure 3:
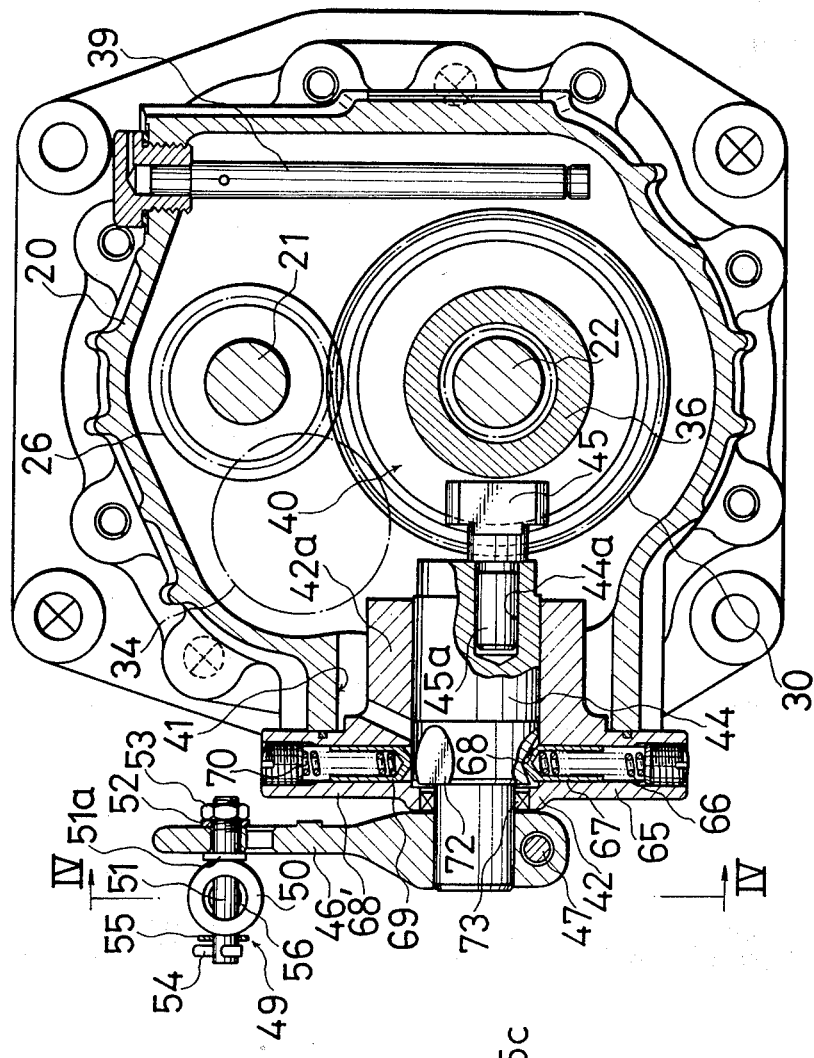
FIG. 3 is a sectional view, partially omitted, taken along line III—III of FIG. 1 showing a part of the clutch mechanism shown in FIG. 1 and a part of the first embodiment.

Referring now to the drawings, there is shown in FIGS. 1 to 9 a preferred embodiment of the clutch engaging and disengaging means according to the present invention. As shown in FIGS. 1 to 3, a clutch housing 20 adapted for mounting on a boat such as pleasure boat or the like is provided which rotatably supports an input shaft 21 and an output shaft 22. The input shaft 21 is drivingly coupled at the front end thereof and at outside the housing 20 to engine crankshaft 23 by flexible coupling means 24 and is rotated by the engine. The output shaft 22 is coupled at the rear end thereof and at outside the housing 20 to propeller shaft or transmission shaft coupled to such propeller shaft (not shown) by coupling means 25. On the input shaft 21 are provided a forward direction input gear 26 and a backward direction input gear 27 each having a relatively small diameter both of which gears are formed integrally with the shaft 21. On the output shaft 22 are mounted rotatably relative to this shaft 22 a forward direction output gear 30 and a backward direction output gear 31 each having a relatively large diameter respectively through bearings 28 and 29. The forward direction output gear 30 is in constant mesh with the forward direction input gear 26, whereas the backward direction output gear 31 is in constant mesh with a backward direction idler gear 34 which is mounted rotatably through a bearing 33 on a supporting shaft 32 within the clutch housing 20 and which in turn is in constant mesh with the backward direction input gear 27. The clutch mechanism shown is fashioned such that it operatively connects the forward direction output gear 30 or backward direction output gear 31 selectively to the output shaft 22 so as to cause rotation of the output shaft 22 by the input shaft 21 with a reduced speed of rotation selectively into forward or backward direction of boat propulsion.

As shown in FIG. 1, the output shaft 22 has a helical spline portion 35 between the output gears 30 and 31. By utilizing such helical spline portion 35, a movable clutch member 36 is mounted on the output shaft 22 non-rotatably relative to the shaft 22 but movably along the axial direction of such shaft 22. This movable clutch member 36 has a pair of cone-shaped friction surfaces 37 and 38 which are faced to cone-shaped friction surfaces 30a and 31a formed to the boss portions of output gears 30 and 31, respectively. When the movable clutch member 36 has been shifted along the output shaft 22 toward the left as viewed in FIG. 1 to cause a frictional engagement of the friction surface 37 to the friction surface 30a, as shown in FIG. 1 with respect to the lower half of clutch member 36, the forward direction output gear 30 becomes connected to the output shaft 22 non-rotatably relative to such shaft 22 through the movable clutch member 36 so that the output shaft 22 is driven to rotate in the forward direction of boat propulsion. Conversely, when the movable clutch member 36 has been shifted along the output shaft 22 toward the right as viewed in FIG. 1 to cause a frictional engagement of the friction surface 38 to the friction surface 31a, the backward direction output gear 31 becomes connected to the output shaft 22 non-rotatably relative to such shaft 22 through the movable clutch member 36 so that the output shaft 22 is driven to rotate in the backward direction of boat propulsion. In the state where both of the friction surfaces 37 and 38 of movable clutch member 36 are not engaged to the friction surfaces 30a and 31a of output gears 30 and 31, respectively, as shown in FIG. 1 with respect to the upper half of such clutch member, the clutch mechanism shown is in a neutral position or state and the output shaft 22 is out of rotation. The present invention relates to a novel engaging and disengaging means which shifts the movable clutch member 36 from the neutral position to cause engagement of the clutch mechanism in the forward or backward direction of boat propulsion and which conversely returns the movable clutch member 36 from one or another clutch engaging position into the neutral position to cause disengagement of the clutch mechanism. In FIGS. 1 and 3, numeral 39 designates a detector for detecting the level of lubricant oil in the clutch housing 20.

Figure 5:
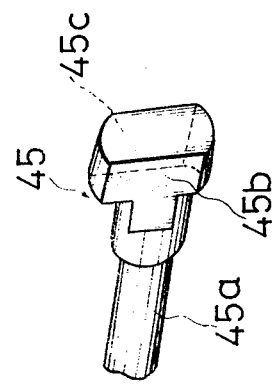
FIG. 5 is a perspective view showing a shifting member employed in the clutch engaging and disengaging means shown in FIGS. 3 and 4.

As shown in FIGS. 1 and 3, the movable clutch member 36 is provided at the middle portion thereof with an annular groove 40. As shown in FIG. 3, the clutch housing 20 is formed at a vertical wall thereof with an opening 41 through which a support sleeve 42 is inserted into the housing 20 at an inwardly projected sleeve portion 42a of such sleeve 42. This support sleeve is fastened to the outer surface of the housing 20 by fastening means 43 shown in FIG. 4. The support sleeve 42 rotatably supports a control shaft 44 both end portions of which are projected from such support sleeve 42. As shown in FIG. 3, the inner end portion of control shaft 44 is formed with an eccentric bore 44a. A shifting member 45 is rotatably supported by the control shaft 44 by fitting a shaft portion 45a of such member 45 into the eccentric bore 44a. Head portion of the shifting member 45 which portion is inserted into the annular groove 40 of movable clutch member 36 has at both sides thereof a pair of flattened engaging surfaces 45b and 45c, as shown in FIG. 5. These engaging surfaces 45b and 45c engage to one and another inner side walls of the groove 40, respectively. Since the shifting member 45 is supported by the control shaft 44 at a location eccentric to the axis of such shaft, when such control shaft 44 is rotated into one or another direction the shifting member 45 pushes at one or another engaging surface 45b or 45c thereof the movable clutch member 36 at within the groove 40 to cause a displacement of the movable clutch 36 into one or another direction. As shown in FIGS. 3 and 4, a control lever 46 is secured to the base end of control shaft 44 at outside the support sleeve 42 for the purpose of providing rotation to the shaft 44. Securing of such control lever 46 to the shaft 44 is attained by fastening the lever by means of bolt 47. The control shaft 44 is rotated into one or another direction when the control lever 46 is operated to rotate about the axis of control shaft 44.

Operation of the control lever 46 is attained by a remote control through push-pull-type control cable means. A preferred example of systems for such remote control is a remote control system of the type having a single remote control lever for operating both the throttle of engine and clutch which is disclosed in, for example, U.S. Pat. No. 3,043,159. In general, a remote control system of this type is fashioned such that an engine is kept idling by a reduced supply of fuel to such engine during the time when the single remote control lever is displaced or rotated from the neutral position thereof into one or another direction within a clutch engaging range to cause an engagement of clutch by a remote control and, after such engagement of clutch, power of the engine is regulated by the control lever in a normal operation state of such engine which is attained by displacing or rotating the remote control lever beyond the clutch engaging range so as to increase supply of fuel to the engine. Conversely, when a remote control for disengaging the clutch is carried out in such remote control system, the engine idles firstly due to a reduction in supply of fuel to such engine by a displacement of the remote control lever toward the neutral position and then the clutch becomes disengaged in the idling state of the engine by a further displacement of the control lever toward the neutral position. In FIG. 4, numeral 48 designates a push-pull rod which is attached to the terminal end of an inner cable of control cable means employed in such remote control system.

The control lever 46 is connected to the push-pull rod 48 through a novel coupling 49 which will be detailed hereinafter. As shown in FIG. 4, the novel coupling 49 comprises a first coupling member or hollow cylindrical holder 50 which is connected rotatably at the terminal end thereof to a free end portion of the control lever 46 by a pin 51 which extends in parallel to the control shaft 44 and through the holder 50 and lever 46. For the purpose of preventing a falling-out of the pin 51, the control lever 46 is sandwiched by a flanged mid portion 51a of the pin 51 and by a ring 22 and nut 53 and the holder 50 is sandwiched by another ring 55, which is prevented from falling out by a hook-like retaining means 54, and by the above stated flanged mid portion 51a, as shown in FIG. 3. Within the holder 50 is disposed on the axis of such holder a second coupling member or coupling rod 56 which is movable along the axial direction of the holder 50, as shown in FIG. 4. The push-pull rod 48 is fixedly connected to this coupling rod 56 by threadedly fitting a threaded end portion 48a of such push-pull rod 48 into a corresponding threaded bore formed to the base end portion of the coupling rod 56. On the threaded end portion 48a is threadedly mounted an adjusting nut 57 which is engaged to an end face of the coupling rod 56. Relative position of connection between the push-pull rod 48 and coupling rod 56 may thus be varied or adjusted by rotating the nut 57 with keeping the push-pull rod 48 non-rotatable so as to displace axially the rod 48. As will be detailed later, push direction of the push-pull rod 48 (direction shown by arrow C in FIG. 4) from the neutral position or state shown in FIG. 4 is operating direction of engaging the clutch in the forward direction and pull direction of the push-pull rod 48 (direction reverse to arrow C) from the neutral position or state is operating direction of engaging the clutch in the backward direction.

The coupling 49 comprising the holder 50 pivotally connected to the control lever 46 through the pin 51 and the coupling rod 56 fixedly connected to the push-pull rod 48 may be extended and contracted telescopically along the push-pull direction of push-pull rod 48 by a relative sliding movement between the holder 50 and coupling rod 56. For the purpose of limiting the relative sliding movement or displacement between the two movable members 50 and 56 in this extensible and contractible coupling 49 and further for the purpose of providing the control lever 46 with a force for rotating such lever which will be explained later, a mechanism is provided which will be detailed hereinafter.

As also shown in FIG. 4, a first and second tubular slidable members 58 and 59 are slidably mounted on the coupling rod 56. On the coupling rod 56 is disposed a compression spring 60 which is received at respective ends thereof by the flanged end portion 58a and 59a of the slidable members 58 and 59. The compression spring 60 thus forces the slidable members 58 and 59 to slide apart from one another. The outer peripheral surfaces of flanged end portion 58a and 59a of the slidable members 58 and 59 are slidably received by the inner circumferential surface of holder 50 so that the coupling rod 56 is supported within the holder 50 so as not to cause a vibration relative to the holder. The holder 50 is formed at the inner circumferential surface thereof and at a mid position thereof with an annular stepped portion 61 to which the first slidable member 58 may engage at the flanged end portion 58a thereof non-slidably toward the direction of arrow C. Further, the holder 50 is fixedly provided at the inner circumferential surface thereof and at near the base end thereof with a circlip 62 to which the second slidable member 59 may engage at the flanged end portion 59a thereof non-slidably toward the direction reverse to arrow C. On the coupling rod 56 is fixedly provided near the terminal end thereof another circlip 63 to which the first slidable member 58 may be engaged from the direction of arrow C by the action of compression spring 60. Further, the coupling rod 56 is formed at the base end thereof with a flanged portion 64 to which the second slidable member 59 may be engaged from the direction reverse to arrow C by the action of compression spring 60. The circlip 63 and flanged portion 64 provided on the second coupling member or coupling rod 56 at both ends of such rod constitute a pair of stopper means for the slidable members 58 and 59. The stepped portion 61 and circlip 62 provided on the inner circumferential surface of the first coupling member or holder 50 constitute another pair of stopper means which limit the range of sliding movement of the slidable member 58 and 59 relative to the holder 50, as can be understood from the description of operation which will be made later. In the first embodiment, extensible and contractible range or scope of the coupling 49 and, therefore, relative positions of the holder 50 and coupling rod 56 at the extremity of extension and contraction are determined by a cooperation of the slidable members 58 and 59 and stopper means 61, 62, 63 and 64, that will also be detailed later.

In the clutch engaging and disengaging means shown, detent means which retains the control lever 46 in the neutral position so as to maintain the neutral state or position of clutch mechanism is provided in a fashion which will be detailed hereinafter. As shown in FIGS. 3 and 4, the support sleeve 42 is formed with a hollow cylindrical portion 65 which extends along a direction perpendicular to the control shaft 44. Into such cylindrical portion 65 is slidably fitted a detent bar 67 which is forced to slide toward the control shaft 44 by a compression spring 66. As shown in FIGS. 3 and 6, the circumference of control shaft 44 is formed with a notch 68 having a pair of circumferentially extending sloped inner surfaces. At the neutral state or position of clutch mechanism, the detent bar 67 is fitted at a sharpened end thereof into the notch 68 by the action of spring 66 and restrains the control shaft 44 from a free rotational displacement so that the neutral state or position of clutch mechanism is maintained. The clutch operating mechanism shown is further fashioned such that action of the aforedescribed coupling 49 will be assisted by the detent means and similar means.

Figure 6A:
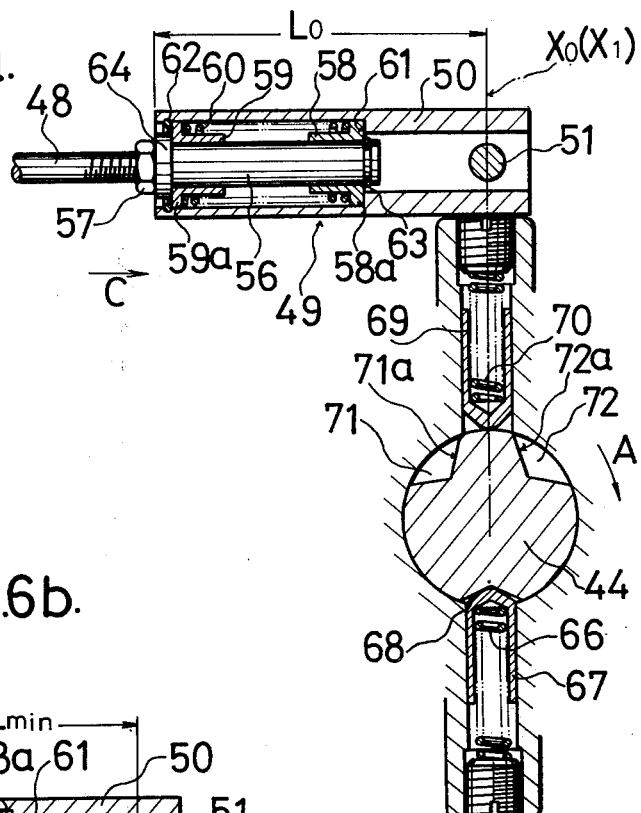

As shown in FIGS. 3 and 4, the support sleeve 42 is further formed with another hollow cylindrical portion 68' which is faced to the cylindrical portion 65 across the control shaft 42. Into this another cylindrical portion 68' is also slidably fitted a bar 69 having a sharpened end which bar is forced to slide toward the control shaft 44 by a compression spring 70, as shown in FIGS. 3, 6, 7, 8 and 9. The circumference of control shaft 44 is further formed with a pair of other notches 71 and 72 into which the bar 69 may be projected at the sharpened end thereof selectively. Each of these notches 71 and 72 also has a pair of circumferentially extending sloped inner surfaces. These notches 71 and 72 are disposed such that the bar 69 is in contact at the sharpened end thereof with the circumference of control shaft 44 at between such notches in the neutral state or position of clutch mechanism in which the detent bar 67 is fitted into the notch 68 at the middle of this notch, as shown in FIG. 6a. The notches 71 and 72 are further disposed such that the bar 69 is projected into one of the notches 71 and engages to one of the sloped inner surfaces 71a located at the side of the other notch 72, as shown in FIG. 6d, in the engaged state of clutch mechanism in the forward direction, whereas the bar 69 is projected into the other notch 72 and engages to one of the sloped inner surfaces 72a located at the side of said one notch 71, as shown in FIG. 8c, in the engaged state of clutch mechanism in the backward direction. Another consideration is further taken on disposition of the notches 68, 71 and 72, that will be detailed later in connection with operation.

The clutch engaging and disengaging means shown in FIGS. 1 to 9 operates as follows.

FIGS. 6a, 6b, 6c and 6d illustrate successively displacement of each member of the coupling 49, relative position or phase of the control shaft 44 in the direction of rotation of such shaft 44 and rotated angle $\theta$ of the control lever 46 during the time when the clutch mechanism becomes engaged in the forward direction from the neutral position of operating means shown in FIG. 6a to the clutch-engaged state shown in FIG. 6d. The rotated angle $\theta$ is shown as angle between axis $X_0$ of the lever 46 in the neutral position and axis $X_1$ of such lever 46 at each time of operation. In the neutral state shown in FIG. 6a, the rotated angle $\theta$ is zero and the detent bar 67 is fitted into the notch 68 at the middle of such notch. The first slidable member 58 of coupling 49 is in contact with the stepped portion 61 on the inner circumference of holder 50 as well as with the circlip 63 on the terminal end of coupling rod 56, whereas the second slidable member 59 is in contact with the circlip 62 on the inner circumference of holder 50 as well as with the flanged portion 64 on the base end of coupling rod 56. In this neutral state, effective length of the coupling 49, namely distance between the center of pin 51 and base end of coupling rod 56, is $L_0$ shown in FIG. 6a.

Figure 6B:
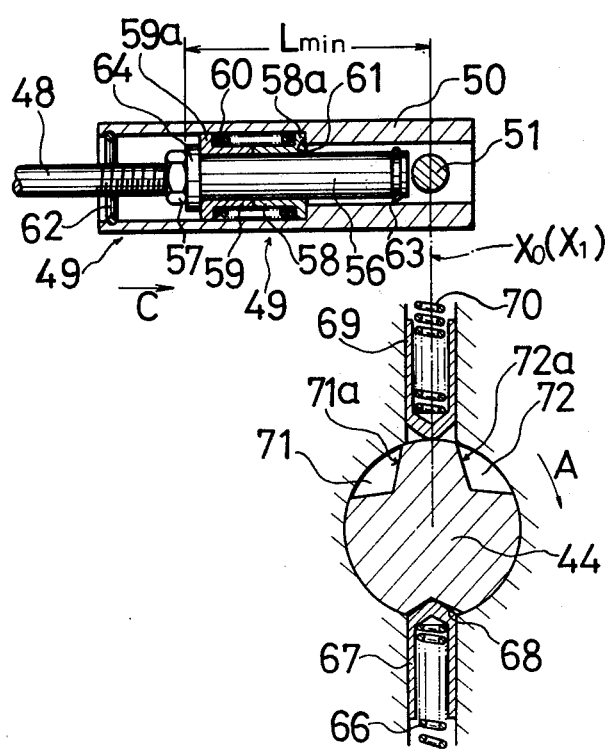

When the push-pull rod 48 becomes pushed toward the direction of arrow C from the neutral position shown in FIG. 6a, the coupling rod 56 is pushed toward the same direction to move into the holder 50 so that the effective length of coupling 49 becomes reduced. The first slidable member 58 remains at the original position, since it is prevented from moving toward the direction of arrow C by the stepped portion 61 on the inner circumference of holder 50. As the coupling rod 56 is pushed to move into the holder 50, the second slidable member 59 is pushed by the flanged portion 64 on the base end of such rod 56 to move into the holder 50 so that the compression spring 60 becomes shortened or compressed resulting in a successive increase in force of such spring 60. Such successively increased force of the spring 60 acts upon the control lever 46 through the holder 50 and pin 51 so as to rotate the lever 46 into the direction of arrow A shown in FIG. 4. The control lever 46 is, however, not rotated due to an existing resistance against rotation of such lever 46 even when the compression spring 60 has been shortened or compressed, as shown in FIG. 6b. That is, such resistance against rotation of the control lever 46 corresponds mainly to a force required for getting out the detent bar 67 from the notch 68 on the control shaft 44 against the force of detent spring 66 and to a resistivity against rotation of the control shaft 44 given by oil seal 73 disposed on such shaft 44 as shown in FIG. 3 and the like. And, the compression spring 60 is fashioned such that it does not overcome yet such resistance against rotation of the lever 46 even when the spring 60 has been most compressed. When the coupling rod 56 and second slidable member 59 has been pushed from the neutral position or state shown in FIG. 6a to reach the position or state shown in FIG. 6b where the second slidable member 59 has become in contact with the first slidable member 58, the coupling rod 56 can no more be pushed into the holder 50 because the first slidable member 58 is prevented from moving toward the direction of arrow C by the stepped portion 61 on the inner circumference of holder 50. The effective length of coupling 49 has thus been reduced to its minimum length Lmin at the state shown in FIG. 6b. After the coupling 49 has thus been shortened to such minimum length, pushing action of the push-pull rod 48 is applied directly to the control lever 46 through the coupling 49 which is now non-contractible so that the control lever 46 is rotated into the direction of arrow A as the coupling 49 is displaced toward the direction of arrow C. By such rotation of control lever 46, the control shaft 44 is rotated into the same direction so that the detent bar 67 becomes got out from the detent notch 68, as shown in FIG. 6c. As can be seen from FIG. 6c, the aforestated notch 71 is located on the shaft 44 so that the sharpened end of bar 69 has already been somewhat projected into such notch 71 at on the sloped inner surface 71a when the detent bar 67 has just been got out from the detent notch 68. The clutch operating means shown is fashioned such that the shifting member 45 which pushes, as the control shaft 44 is rotated into the direction of arrow A, the movable clutch member 36 to displace toward the forward direction output gear 30 does not cause yet a contact of the friction surface 37 of clutch member 36 with the friction surface 30a of the output gear 30 at the state shown in FIG. 6c where the rotated angle of control lever 46 is $\theta_1$ shown. Engaging of the clutch from the state shown in FIG. 6c is achieved by a spring action. That is, when the detent action has been released by the moving of detent bar 67 from notch 68, resistivity against rotation of the control lever 46 becomes much reduced. Consequently, the compression spring 60 of coupling 49 which spring has been most compressed and has accumulated a spring force pushes the holder 50 toward the direction of arrow C to lengthen the coupling 49 resulting in a some further rotation of the control lever 46 in the direction of arrow A. By this, the control shaft 44 is rotated further in the direction of arrow A so that the shifting member 45 further pushes the movable clutch member 36 to cause a contact of the friction surface 37 of such member 36 with the friction surface 30a of forward direction output gear 30. Since the clutch operating means shown is fashioned such that the sharpened end of bar 69 is located on the sloped surface 71a of notch 71 at the state shown in FIG. 6c, the aforestated compression spring 70 which forces the bar 69 to project toward the control shaft 44 provides a rotating force to the shaft 44 through the bar 69 and sloped surface 71a to assist the rotation of control shaft 44 in the direction of arrow A. The rotation of control lever 46 and control shaft 44 into the direction of arrow A from the state shown in FIG. 6c is thus attained with ease. Meanwhile, contact between the friction surfaces 37 and 30a is achieved at a rotated angle $\theta_2$ of control lever 46 shown in FIG. 6d which angle is somewhat larger than the aforestated angle $\theta_1$. At the state shown in FIG. 6d, the first and second slidable members 58 and 59 in the coupling 49 is apart from one another by a distance corresponding to the difference $\theta_2 - \theta_1$ between the mentioned rotated angle $\theta_2$ and $\theta_1$ and the effective length of coupling 49 is Lf which is somewhat larger than the minimum length Lmin. The bar 69 projects into the notch 71 somewhat more largely as compared to the state shown in FIG. 6c and engages to the sloped surface 71a. Once a contact between the friction surfaces 37 and 30a is caused at the state shown in FIG. 6d, the movable clutch member 36 is forced or pressed toward the forward direction output gear 30 by a free wheel action due to rotation torque so that under a normal operation of engine the friction surfaces 37 and 30a are engaged to one another with a force of engagement which depends on the torque transmitted by the clutch.

Figure 7A:
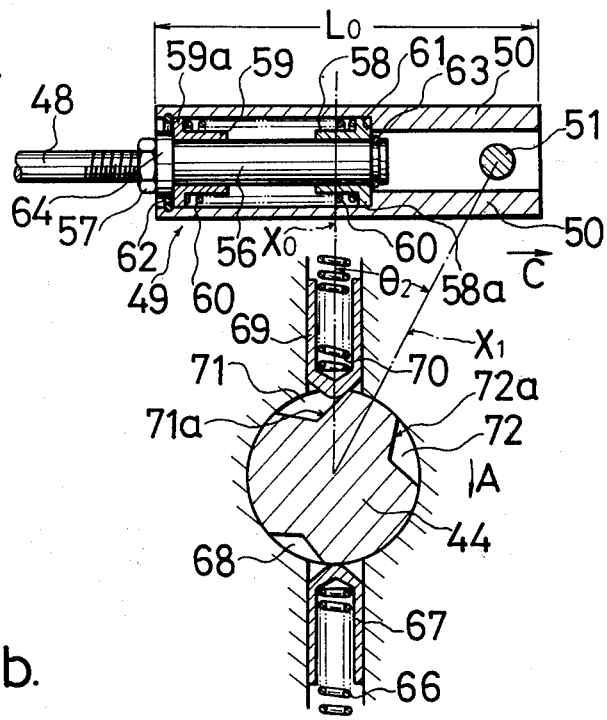
Figure 7B:
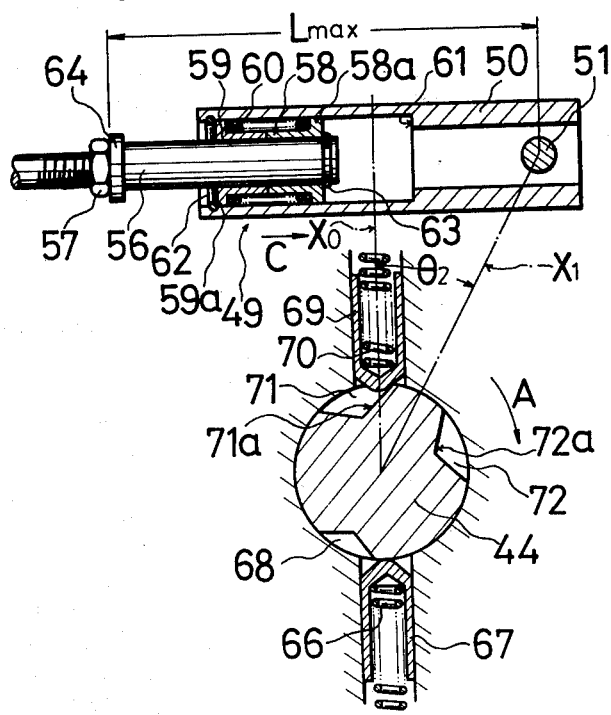

FIGS. 7a, 7b and 7c illustrate in a manner similar to that for FIGS. 6a to 6d three states on the way of disengaging the clutch from the clutch-engaged state in the forward direction shown in FIG. 6d to the neutral state shown in FIG. 6a under an idling operation of engine. For disengaging the clutch from the engaged state shown in FIG. 6d, the push-pull rod 48 is pulled toward the direction reverse to arrow C. By such pulling action only the coupling rod 56 is pulled firstly to move toward the same direction so that the coupling 49 recovers the original effective length $L_0$, as shown in FIG. 7a. The second slidable member 59 follows the coupling rod 56 by the action of compression spring 60 and such spring 60 also recovers the original length. The circlip 63 on the terminal end of coupling rod 56 becomes engaged to the first slidable member 58 at the state shown in FIG. 7a. By a further pulling action of the push-pull rod 48, the coupling rod 56 is further pulled out of the holder 50 so that the coupling 49 is lengthened or extended and the first slidable member 58 is moved toward the direction reverse to arrow C to shorten or compress the compression spring 60. Extension of the coupling 49 is completed when the first slidable member 58 has been engaged to the second slidable member 59 which is prevented from moving toward the direction reverse to arrow C by the circlip 62, as shown in FIG. 7b, so that sole movement of the coupling rod 56 has become impossible. At this state shown in FIG. 7b, the effective length of coupling 49 becomes the maximum length Lmax and the compression spring becomes most compressed. Although the compression spring 60 becomes compressed resulting in a successive enlargement in spring force thereof until the state shown in FIG. 7b, the control lever 46 is not rotated due to an existing resistance against rotation of such lever 46 which resistance is caused maninly by the clutch engagement itself. The control lever 46 thus remains at the rotated angle $\theta_2$ in the state shown in FIG. 6d. As from the state shown in FIG. 7b, the whole of coupling 49 is displaced toward the direction reverse to arrow C by the pulling action of push-pull rod 48. Consequently, the control lever 46 is rotated into the direction reverse to arrow A so that the control shaft 44 is rotated into the same direction. By this, the shifting member 45 at the end of such control shaft 44 pushes the movable clutch member 36 reversely as compared to the case of clutch engaging operation so that the friction surface 37 of movable clutch member 36 is pulled apart from the friction surface 30a of forward direction output gear 30 by the moment where the rotated angle of control lever 46 has become $\theta_1'$ shown in FIG. 7c. The clutch is thus disengaged and resistance aganist rotation of the control lever becomes much reduced. As shown in FIG. 7c, the notches 68 and 71 are disposed so that when the bar 69 has just been got out from the notch 71 the sharpened end of detent bar 67 has already been somewhat projected into the notch and has already been engaged to the sloped inner surface 68a of such notch 68. As from the state shown in FIG. 7c, the holder 50 is displaced toward the direction reverse to arrow C by the action of compression spring 60 which has been most compressed and has accumulated an enlarged spring force. By this, the control lever 46 becomes further rotated into the direction reverse to arrow A to return to the original position where angle $\theta$ is zero. This returning action of control lever 46 is assisted by such an action that the detent bar 67 is projected into the deepest portion of detent notch 68 by the force of compression spring 66. Both of the slidable members 58 and 59 on the coupling rod 56 becomes separated from one another by the action of compression spring 60. The neutral state shown in FIG. 6a is thus recovered.

Engaging action of the clutch in the backward direction by displacing the movable clutch member 36 toward the backward direction output gear 31 to cause an engagement between the friction surfaces 38 and 31a and disengaging action of the clutch by displacing the movable clutch member 36 apart from the backward direction output gear 31 to release the engagement between the friction surfaces 38 and 31a are substantially same as the engaging and disengaging actions having been detailed hereinbefore. These actions will be explained simply by referring to FIGS. 8a, 8b and 8c which illustrate in a manner similar to that for FIGS. 6b to 6d the steps of engaging the clutch in the backward direction from the neutral state shown in FIG. 6a and by referring to FIGS. 9a, 9b and 9c which illustrate in a manner similar to that for FIGS. 7a to 7c the steps of disengaging the clutch from the clutch-engaged state shown in FIG. 8c.

Referring to FIGS. 8a to 8c, when the push-pull rod 48 is pulled from the neutral state shown in FIG. 6a for engaging the clutch in the backward direction the coupling rod 56 is firstly moved soley toward the direction reverse to arrow C so that the coupling 49 is extended to its maximum length Lmax shown in FIG. 8a. Until then, the control lever 46 is not rotated and the compression spring 60 becomes most compressed and accumulate a spring force. By a further pulling action of the push-pull rod 48, the whole of coupling 49 is displaced toward the direction reverse to arrow C to cause a rotation of the control lever 46 and control shaft 44 into the direction reverse to arrow A so that the state shown in FIG. 8b where the detent bar 67 has just been moved from the notch 68 is attained. In this state, the rotated angle of lever 46 is $\theta_1$ and the friction surface 38 of movable clutch member 36 has not become in contact with the friction surface 31a of backward direction output gear 31 yet. Relative locations of the notches 68 and 72 are predetermined such that when the detent bar 67 has just been moved from the notch 68 the sharpened end of bar 69 has already been somewhat projected into the notch 72 and been engaged to the sloped surface 72a, as is the case of relative locations of the notches 68 and 71. As from the state shown in FIG. 8b, the compression spring 60 of coupling 49 displaces the holder 50 sowewhat toward the direction reverse to arrow C to cause a some further rotation of the control lever 46 and control shaft 44 into the direction reverse to arrow A so that the friction surface 38 of movable clutch member 36 comes in contact with the friction surface 31a of backward direction output gear 31 at the state shown in FIG. 8c where the effective length of coupling 49 is Lr and the rotated angle of control lever 46 is $\theta_2$. Rotating displacement of the control lever 46 and control shaft 44 from the state shown in FIG. 8b into the direction reverse to arrow A is assisted by such an action that the bar 69 is projected into the notch 72 by the force of spring 68.

Figure 9A:
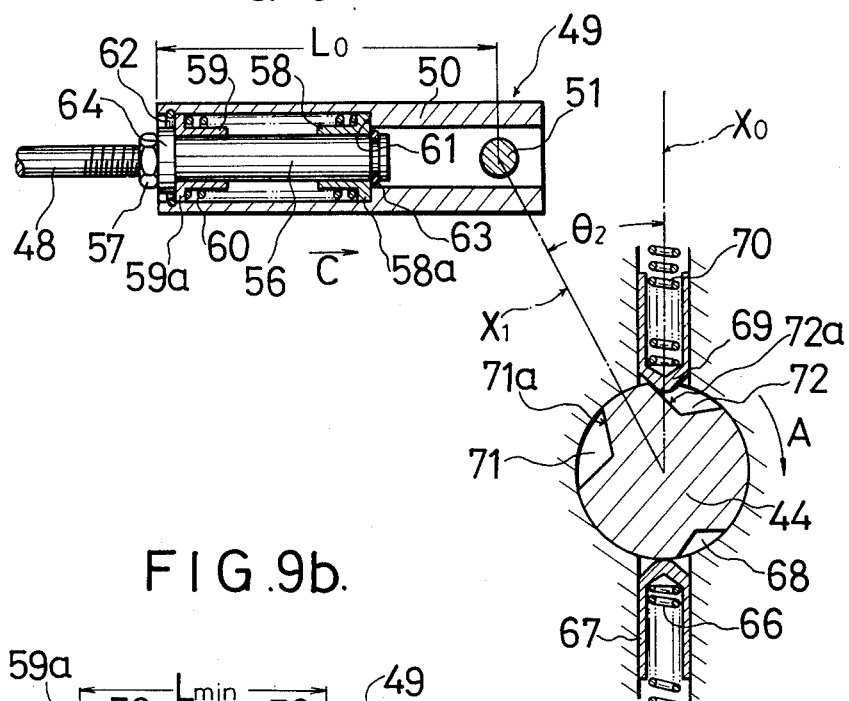
FIGS. 9a, 9b and 9c are sectional views illustrating successively movements of one and another parts of the first embodiment when the clutch is operated to disengage from the engaged state in the backward direction of rotation.
Figure 9B:
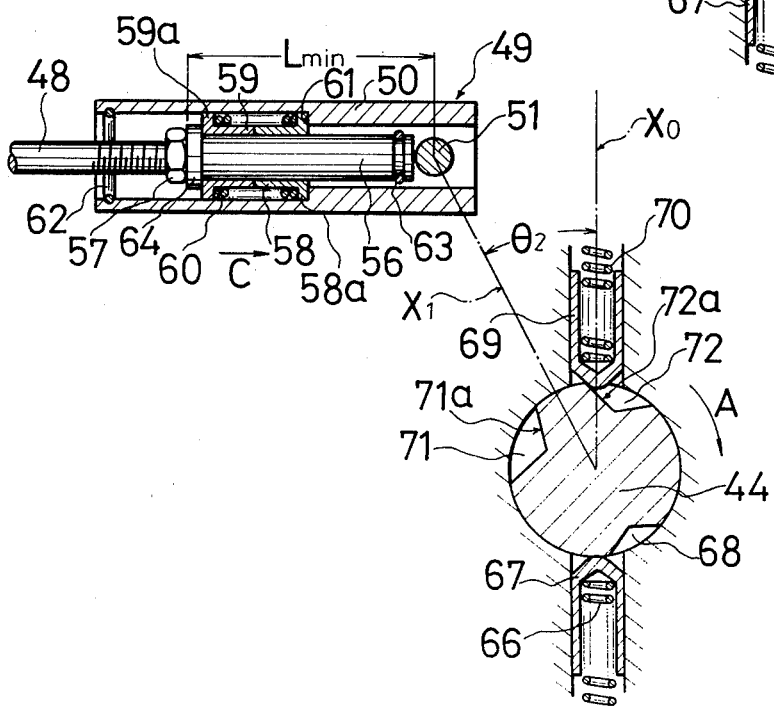
Figure 9C:
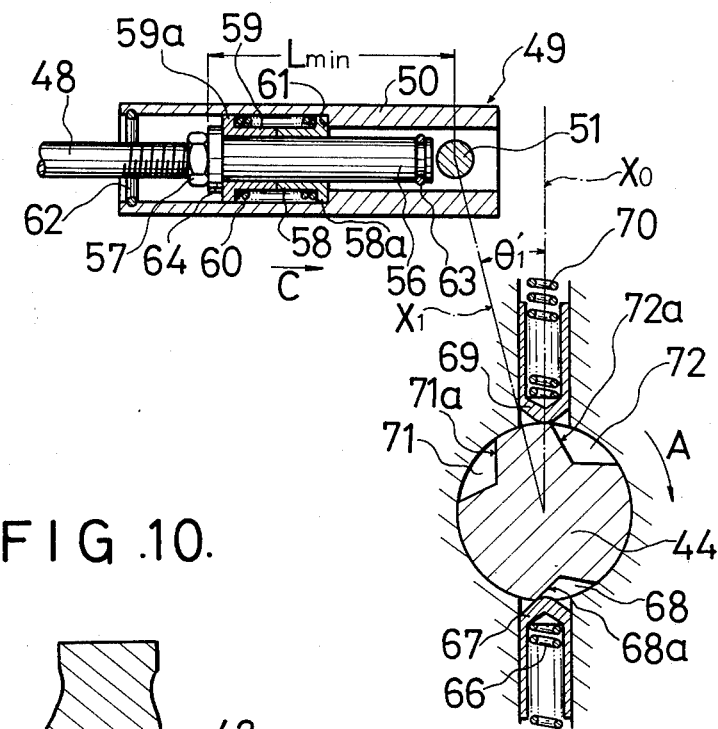

Turning to a consideration of FIGS. 9a to 9c, when a pushing action is provided to the push-pull rod 48 from the state shown in FIG. 8c where the clutch is engaged in the backward direction the coupling rod 56 is pushed into the holder 49. By this, the coupling 49 is shortened once to the original effective length Lo shown in FIG. 9a and then to the minimum effective length Lmin shown in FIG. 9b. The control lever 46 is not rotated during such shortening step of coupling 49 and the compression spring 60 becomes shortened or compressed successively from the state shown in FIG. 9a until the state shown in FIG. 9b to accumulate a spring force. As from the state shown in FIG. 9b, the whole of coupling is displaced toward the direction of arrow C so that the control lever 46 and control shaft 44 is displaced to rotate into the direction of arrow A. The friction surface 38 of movable clutch member 36 is pulled apart from the friction surface 31a of backward direction output gear 31 by the moment where the lever 46 is rotated from the rotated angle $\theta_2$ shown in FIG. 9b to the rotated angle $\theta_1$ shown in FIG. 9c. As shown in FIG. 9c, a consideration is taken so that the bar 69 has already been moved from the notch 72 when the detent bar 67 has just been projected into the notch 68 and engaged to the sloped surface 68a. As from the state shown in FIG. 9c, the holder 50 is pushed by the action of compression spring 60 to move somewhat toward the direction of arrow C to cause a further rotation of the control lever 46 and control shaft 44 into the direction of arrow A. The neutral state shown in FIG. 6a is thus recovered. The compression spring 66 which forces the detent bar 67 to project into the notch 68 assists such recovering to the neutral.

As detailed hereinbefore, in a clutch engaging process as well as in a clutch disengaging process the compression spring 60 provided in the coupling 49 which is extensible and contractible within a limited scope of extension and contraction is compressed due to a contraction or extension of the coupling 49 to enlarge its spring force and accumulates such enlarged spring force and such compression spring 60 rotates the control lever 46 by its enlarged and accumulated spring force at the terminal moment of clutch engaging or disengaging operation. Rotation of the lever 46 by the force of spring 60 at the terminal moment of clutch engaging operation is achieved with ease owing to a large reduction in resistance against rotation of the lever 46 due to getting-out of the detent bar 67 from the notch 68. Rotation of the lever 46 by the force of spring 60 at the terminal moment of clutch disengaging operation is achieved with ease owing to a large reduction in resistance against rotation of the lever 46 due to releasing of engagement of the movable clutch member 36 to the forward direction output gear 30 or backward direction output gear 31.

One of the facts to be noted is that the compression spring 60 in the coupling 49 forces the control lever 46 into a direction of engaging the clutch by a spring force still at the engaged states shown in FIG. 6d and in FIG. 8c. By such forcing of control lever 46 the movable clutch member 36 is given in an engaged state of the clutch a force or pressure of pressing such member 36 against the forward direction output gear 30 or backward direction output gear 31, whereby an unexpected disengagement of the clutch is not caused. Another fact to be noted is that, because rotation of the control lever 46 at the terminal moment of clutch engaging or disengaging operation is achieved by an extention or contraction of the coupling 49 by the force of spring 60, manufacturing error or tolerance of the remote control system having the push-pull rod 48 is absorbed or swallowed, or at least may be absorbed or swallowed, within the scope of extention and contraction of the coupling 49. In case when such manufacturing error or tolerance is not swallowed, a trouble or damage may be caused in the remote control system. Further, an additional clearance due to abrasion which may occur in the friction surfaces 30a, 31a, 37 and 38, shifting member 45 and the like is also absorbed or swallowed within the scope of extension and contraction of the coupling 49. Abrasion caused in the shifting member 45 is little, since such shifting member 45 becomes engaged to the movable clutch member 36 at the entire area of one or another engaging surfaces 45b or 45c.

A further fact to be noted is that the advantages stated hereinbefore are afforded by the novel coupling 49 which is arranged outside the clutch housing 20. Between a push-pull operating means and a clutch control lever, a coupling means is necessarily provided. The mechanism for smoothing clutch engaging and disengaging operation according to the present invention which is structured by utilizing such coupling means is smple in structure. The coupling 49 outside the clutch housing will make easy an adjustment, maintenance and the like of such coupling. Further, the mechanism which is structured by utilizing coupling means will provide a possibility that, in case when the friction surfaces 30a, 31a, 37 and 38 have much been abraded, clearance caused by such abrasion may be compensated by varying the position of connection of the coupling 49 to the control lever 46, namely position of the aforestated pin 51.

Figure 10:
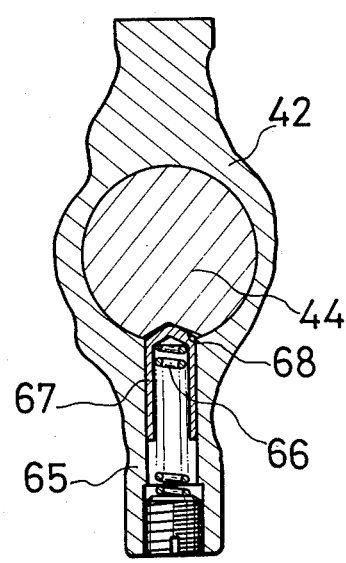
FIG. 10 is a vertical sectional view showing a part of an alternation of the first embodiment.

In the first embodiment shown in FIGS. 1 to 9, there is provided an auxiliary mechanism for assisting the action of compression spring 60 in the coupling 49 which mechanism comprises a compression spring 70, bar 69 and notches 71 and 72. Such auxiliary mechanism is, however, not necessarily required because the compression spring 60 having an accumulated spring force is such that it rotates the control lever 46 when the resistance against rotation of the lever 46 has become much reduced due to a displacement of detent means into non-operative position or due to disengagement itself of the clutch, as detailed before. The auxiliary mechanism may thus be omitted and only the detent means may be associated with the control shaft 44, as is the case in an alternation shown in FIG. 10.

Figure 11:
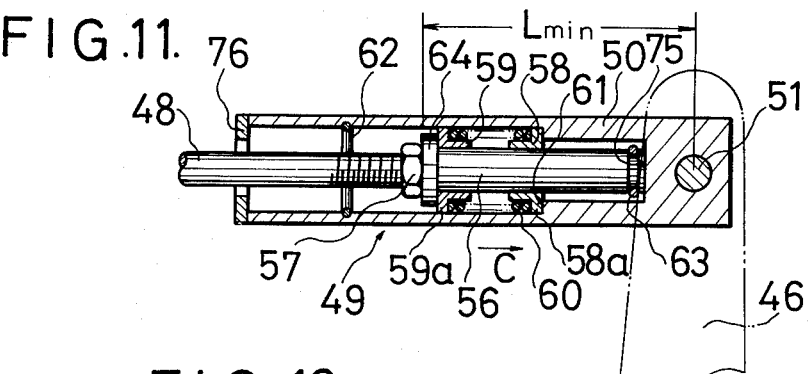
FIG. 11 is a vertical sectional view of a coupling employed in a second embodiment of the clutch engaging and disengaging means according to the present invention.
Figure 12:
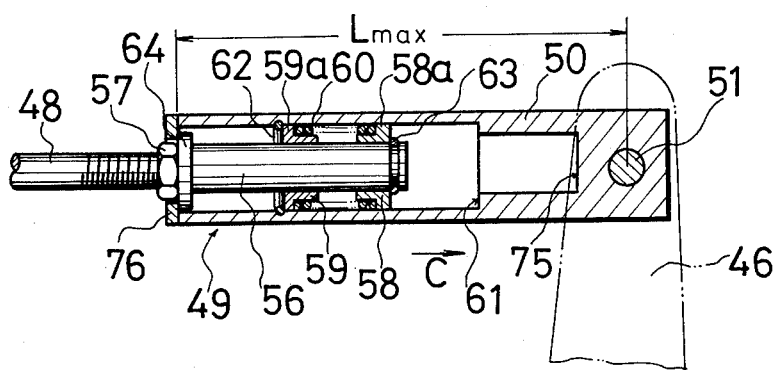
FIG. 12 is a vertical sectional view of the coupling shown in FIG. 11 but showing another state of such coupling.

Further, the scope of extension and contraction of the coupling 49 is limited in the first embodiment shown in FIGS. 1 to 9 by a cooperation of stopper members 61, 62, 63 and 64 and slidable members 58 and 59. That is, contraction of the coupling 49 is limited at the minimum effective length Lmin by the engagement of second slidable member 59, which is pushed to move toward the first slidable member 58 by the flanged portion 64 on the base end of coupling bar 56, to the first slidable member 58 which is prevented from moving toward the direction of arrow C by the stepped portion 61 on the inner circumference of holder 50, whereas extension of the coupling is limited at the maximum effective length Lmax by the engagement of first slidable member 58, which is pushed to move toward the second slidable member 59 by te circlip 63 on the terminal end of coupling rod 56, to the second slidable member 59 which is prevented from moving toward the direction reverse to arrow C by the circlip 62 on the inner circumference of holder 50. In case when the novel coupling is fashioned such that the scope of extension and contraction of such coupling 49 is limited by engaging one of a first pair of stopper members 63 and 64 to one of a second pair of stopper members 61 and 62 through the tubular slidable members 58 and 59, means for limiting the scope of extension and contraction of the novel coupling becomes simplified in structure. Limitation of the scope of extension and contraction of such coupling 49 may, however, be attained by another way. In FIGS. 11 and 12, there is shown a second embodiment of the present invention in which such another way is employed.

In this second embodiment, the base end portion of coupling 49 is formed into a closed portion through which a pin 51 same as the mentioned one 51 extends. The inner face of such closed portion is formed into a stopper surface 75 to which the coupling rod 56 is engaged at the most contracted state of coupling 49, as shown in FIG. 11. To the terminal end of holder 50 is fixedly secured a stopper ring 76 to which the flanged portion 64 on the base end of coupling rod 56 becomes engaged, as shown in FIG. 12, so that the extension of coupling 49 is limited. Tubular slidable members 58 and 59 employed in this second embodiment are fashioned to have a length such that they are out of contact at the most extended state as well as at the most contracted state of the coupling 49.

Figure 13:
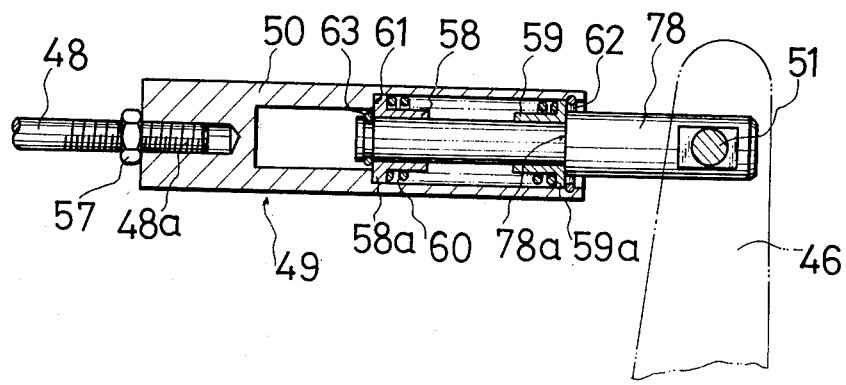
FIG. 13 is a vertical sectional view of a coupling employed in a third embodiment of the clutch engaging and disengaging means according to the present invention.

Turning to a consideration of FIG. 13, a coupling 49 is shown in which the mentioned holder 50 and coupling rod 56 are mutually exchanged in position. In this third embodiment, a push-pull rod 56 is fixedly connected to the holder 50 by threadedly fitting the terminal end of push-pull rod 56 into a threaded bore formed to the closed base end portion of holder 50. The coupling rod 56 is formed with an extension 78 having an enlarged diameter which corresponds to the diameter of aforementioned flanged portion 64, and control lever 46 is pivotally connected to such extension 78 by a pin 51. Stopper function corresponding to that of aforementioned flanged portion 64 is effected by a stepped portion 78a at the base end of extension 78. In FIG. 13, members of the coupling similar to the ones employed in the first embodiment shown in FIGS. 1 to 9 are designated by like reference numerals. As can be understood with ease, the coupling 49 shown in FIG. 13 acts similarly to the coupling 49 employed in the first embodiment.

Each of the couplings 49 employed in the embodiments having been detailed hereinbefore comprises only one compression spring 60 and two tubular slidable members 58 and 59 which constitute a pair of movable spring-receiving members. In FIGS. 14 to 17b, there is shown a coupling 80 which, conversely to each of such couplings 49, comprises two springs and no movable spring-receiving member.

Figure 14:
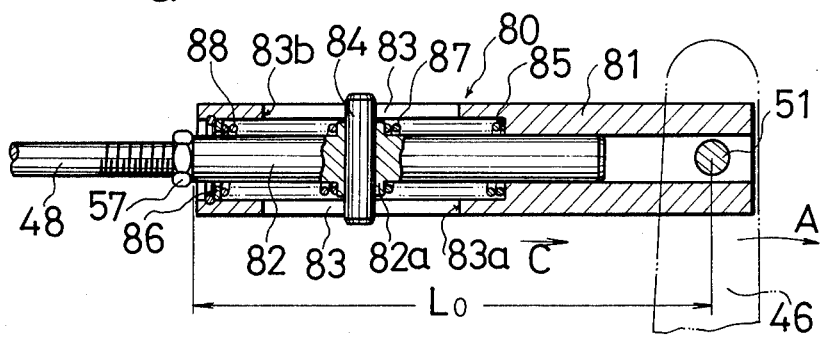
FIG. 14 is a vertical sectional view of a coupling employed in a fourth embodiment of the clutch engaging and disengaging means according to the present invention.
Figure 15:
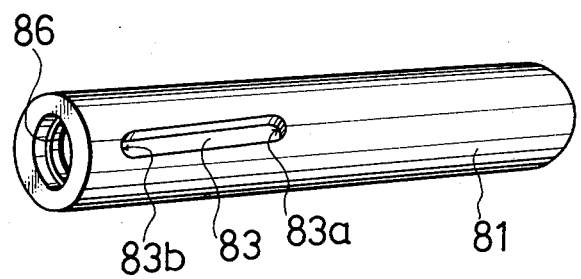
FIG. 15 is a perspective view of a holder employed in the coupling shown in FIG. 14.
Figure 16:
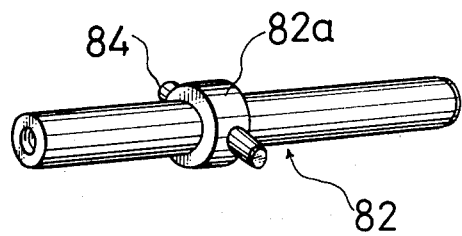
FIG. 16 is a perspective view of a coupling rod and stopper pin employed in the coupling shown in FIG. 14.

The coupling 80 employed in this fourth embodiment also comprises a hollow cylindrical holder 81 which is pivotally connected to the control lever 46 by a pin 51 and a coupling rod 82 to which a push-pull rod 48 is fixedly secured. The coupling 80 is made telescopically extensible and contractable by inserting the coupling rod 82 into the holder 81. For the purpose of limiting the scope of extension and contraction of the coupling 80, the holder 81 is formed along the axial direction thereof with a pair of elongated apertures 83 and a stopper pin 84 which extends through such elongated apertures 83 is supported by the coupling rod 82 at a mid portion having an enlarged diameter 82a of such rod 82 as shown in FIGS. 14, 15 and 16. The contraction of coupling 80 is limited by the engagement of stopper pin 84 to one of the end faces 83a of elongated aperture 83, whereas the extension of coupling 80 is limited by the engagement of stopper pin 84 to the other end face 83b of elongated aperture 83. The inner circumference of holder 81 is formed at a mid portion thereof with an annular stepped portion 85. At the terminal end portion of holder 81 is arranged a ring 86 within the holder. Within the holder 81 are disposed on the coupling rod 82 a first compression spring 87 the ends of which are received respectively by the enlarged mid portion 82a and stepped portion 85 and a second compression spring 88 the ends of which are received respectively by the enlarged mid portion 82a and ring 86.

Figure 17A:
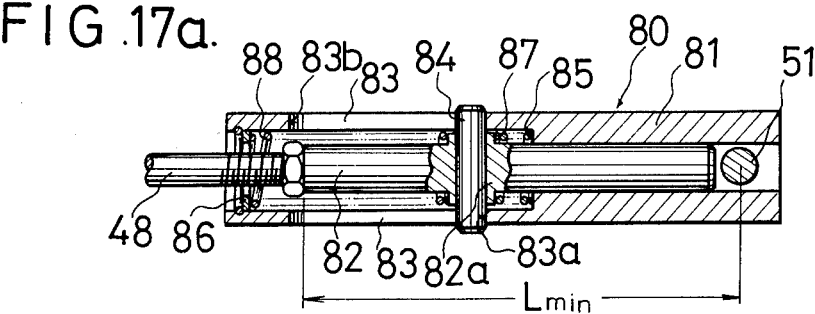
FIGS. 17a and 17b are vertical sectional views of the coupling shown in FIG. 14, illustrating respectively the most contracted state and most extended state of such coupling.
Figure 17B:
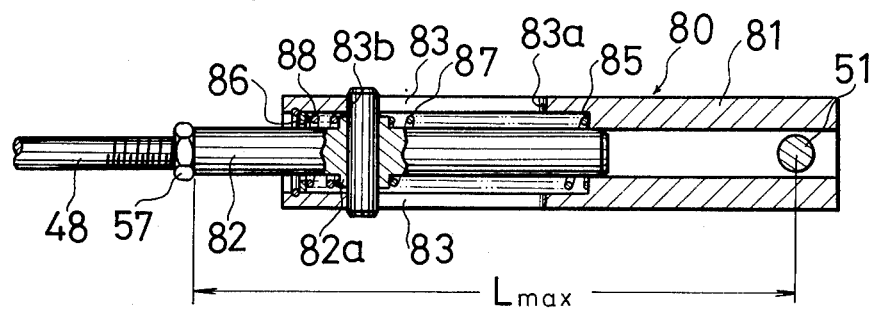

In the coupling 80 employed in this fourth embodiment, when the coupling rod 82 is pushed by a pushing action of the push-pull rod 48 the first compression spring 87 becomes compressed to enlarge its spring force during the time when the coupling 80 becomes contracted from an effective length $L_o$ shown in FIG. 14 to another effective length Lmin in the most contracted state shown in FIG. 17a. Conversely, when the coupling rod 82 is pulled by a pulling action of the push-pull rod 48 the second compression spring 88 becomes compressed to enlarge its spring force during the time when the coupling 80 becomes extended from the effective length Lo shown in FIG. 14 to another effective length Lmax in the most extended state shown in FIG. 17b. When the clutch is operated to engage the same in the forward direction, the first compression spring 87 thus pushes the holder 81, after the detent action has been released, to move toward the direction of arrow C resulting in a final rotation of the control lever 46 in the direction of arrow A. Conversely, when the clutch is operated to disengage the same from the engaged state in the forward direction, the second compression spring 88 pushes the holder 81, after the engagement between friction surfaces 30a and 37 has been released, to move toward the direction reverse to arrow C resulting in a final rotation of the control lever 46 into the direction reverse to arrow A. When the clutch is operated to engage the same in the backward direction, the second compression spring 88 pushes the holder 81, after the detent action has been released, to move toward the direction reverse to arrow C resulting in a final rotation of the control lever 46 into the direction reverse to arrow A. Conversely, when the clutch is operated to disengage the same from the engaged state in the backward direction, the first spring 87 pushes the holder 81, after engagement between the friction surfaces 31a and 38 has beem released, to move toward the direction of arrow C resulting in a final rotation of the control lever 46 into the direction of arrow A. As can be understood with ease, the coupling 80 also exhibits the mentioned advantages of each of the couplings 49.

Provided that each of the compression springs 87 and 88 employed in the coupling 80 shown in FIGS. 14 to 17b were replaced by tension spring means which is secured at both ends thereof to the holder 81 and coupling rod 82, tension spring means taking the place of first compression spring 87 becoms extended to enlarge its spring force when the coupling rod 82 is pulled out of the holder 81 and tension spring means taking the place of second compression spring 88 becomes extended to enlarge its spring force when the coupling rod 82 is pushed into the holder 81.

Figure 18:
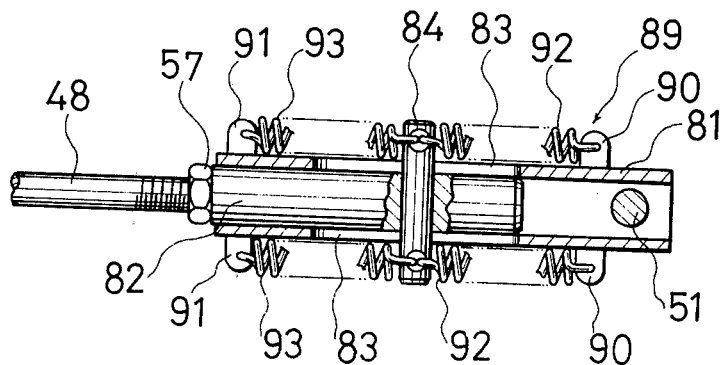
FIG. 18 is a vertical sectional view of a coupling employed in a fifth embodiment of the clutch engaging and disengaging means according to the present invention.

In FIG. 18, a coupling 89 employed in a fifth embodiment of the present invention is shown which is structured in the fashion detailed above. This coupling 89 is provided with a first pair of tension springs 92 and a second pair of tension springs 93 which are secured respectively to stopper pin 84 and securing pieces 90 and 91 attached to the outer surface of holder 81. In this fifth embodiment, the tension springs 92 taking the place of aforementioned first compression spring 87 perform the function of aforementioned second compression spring 88 in place of such spring 88 and the tension spring 93 taking the place of aforementioned second compression spring 88 act the function of aforementioned first compression spring 87 in place of such spring 87. It is thus seen that not only compression spring or springs but also tension spring or springs may be used as spring means employed in the clutch engaging and disengaging means according to the present invention. In the coupling 89 shown in FIG. 18, the scope of extension and contraction of such coupling 89 is limited by limiting means same as that for the coupling 80 shown in FIGS. 14 to 17b. In FIG. 18, parts similar to those shown in FIGS. 14 to 17b are designated by reference numerals used in FIGS. 14 to 17b.

Although there has been shown only one example of clutches which may be operated by the engaging and disengaging means according to the present invention clutches operable by the means according to the present invention are, of course, not limited to the particular clutch shown.

What we claim is:

1. In a mechanically operated double clutch mechanism of the type in which a movable clutch member is displaced axially from a neutral position into a first or second direction selectively from effecting a first or second engagement of the clutch resulting in an operative connection of one power transmitting member to another first or second power transmitting member and in which once the clutch has been engaged said movable clutch member is forced to displace into a direction of engaging the clutch by the torque transmitted by such clutch, a clutch engaging and disengaging means comprising a control lever which is rotated by push-pull control means to displace said movable clutch member and which is retained in its neutral position by a spring-biased detent means, characterized in that said control lever is operatively connected to said push-pull control means by a coupling including a first coupling member fixedly connected to said push-pull control means, and a second coupling member pivotally connected to said control lever, the first and second coupling members being fitted telescopically and being movable relative to each other within a limited range, said coupling further comprising spring means disposed between the first and second coupling members so that spring force of such spring means is enlarged when the first coupling member is moved relative to the second coupling member by the push-pull control means, the arrangement being such that initial movement of the push-pull control means in either direction moves the first coupling member until the first coupling member becomes engaged mechanically with the second coupling member to enlarge the spring force of the spring means, and further movement of the push-pull control means in that direction moves the first and second coupling members together to rotate said control lever until the lever has been freed, respectively, from detenting force by the detent means when the clutch is operated to engage the same and from the force of engagement of the clutch when the clutch is operated to disengage the same, some additional rotation being further provided to said control lever by the enlarged spring force of said spring means.

2. The clutch engaging and disengaging means as claimed in claim 1, characterized in that a pair of tubular slidable members are slidably mounted on one of said first and second coupling members which has a diameter smaller than that of the other coupling member; that said spring means is formed by a compression spring which is disposed on said one coupling member and is received at the ends thereof by said pair of tubular slidable members; that a first pair of stopper means are provided on both ends of said one coupling member, said pair of tubular slidable members being engageable respectively to said first pair of stopper means; and that a second pair of stopper means are provided on the inner surface of said the other coupling member for limiting the scope of sliding movement of each of said slidable members relative to said the other coupling member.

3. The clutch engaging and disengaging means as claimed in claim 2, characterized in that said coupling is fashioned such that the scope of extension and contraction thereof is limited by an engagement between one of said first pair of stopper means and one of said second pair of stopper means through said pair of tubular slidable members and by another engagement between the other of said first pair of stopper means and the other of said second pair of stopper means through said pair of tubular slidable members.

4. The clutch engaging and disengaging means as claimed in claim 1, characterized in that said spring means are formed by a first compression spring and a second compression spring which are received respectively at one ends by said first coupling member and at the other ends by said second coupling member, said first compression spring being arranged so that it becomes compressed by a relative contraction between said first and second coupling members and said second compression spring being arranged so that it becomes compressed by a relative extension between said first and second coupling members.

5. The clutch engaging and disengaging means as claimed in claim 1, characterized in that said spring means comprises a first tension spring means and a second tension spring means which are secured respectively at one ends to said first coupling member and at the other ends to said second coupling member, said first tension spring means being arranged so that it becomes extended by a relative contraction between said first and second coupling members and said second tension spring means being arranged so that it becomes extended by a relative extension between said first and second coupling members.

6. The clutch engaging and disengaging means as claimed in any one of claims 1, 4 and 5, characterized in that one of said first and second coupling members having a diameter larger than that of the other coupling member is formed along the axial direction thereof with at least one elongated aperture into which a stopper pin fixedly secured to said the other coupling member is received whereby the scope of extension and contraction of said coupling is limited by the engagement of said stopper pin to one and the other inner end faces of said elongated aperture.

7. The clutch engaging and disengaging means as claimed in any one of claims 2-5 and 1, characterized in that a control shaft is provided which is formed with a pair of notches which are spaced apart from one another in a circular direction and each of which has a sloped inner surface extending along the circular direction, said control shaft being drivingly connected to said control lever; and a slidable bar arranged so that in the neutral condition the slidable bar is located between said pair of notches and is forced by a spring means to project toward said control shaft, said pair of notches and said slidable bar being disposed so that during a clutch engaging operation said slidable bar is projected at a sharpened end thereof into one of said notches and contacts with said sloped inner surface under the action of the said spring means before said control lever has been freed from detenting force by said detent means.

* * * * *